United States Patent
Kuan et al.

(10) Patent No.: US 9,347,693 B2
(45) Date of Patent: May 24, 2016

(54) SUPPORTING ASSEMBLY

(71) Applicant: AU Optronics Corporation, Hsin-Chu (TW)

(72) Inventors: Hao-Hung Kuan, Hsin-Chu (TW); Tung-I Yen, Hsin-Chu (TW); Ren-Wei Huang, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 84 days.

(21) Appl. No.: 14/200,440

(22) Filed: Mar. 7, 2014

(65) Prior Publication Data

US 2014/0252192 A1  Sep. 11, 2014

(30) Foreign Application Priority Data

Mar. 8, 2013 (CN) .......................... 2013 1 0074753

(51) Int. Cl.
*E04D 13/18* (2014.01)
*F24J 2/52* (2006.01)

(52) U.S. Cl.
CPC .............. *F24J 2/5254* (2013.01); *F24J 2/5237* (2013.01); *Y02E 10/47* (2013.01)

(58) Field of Classification Search
USPC ....................... 248/219.2, 534, 539; 52/173.3
See application file for complete search history.

(56) References Cited

U.S. PATENT DOCUMENTS

| | | | | |
|---|---|---|---|---|
| 5,186,430 A * | 2/1993 | Ellithorpe | ................ | E04G 25/04 248/354.3 |
| 5,661,946 A * | 9/1997 | Davis | ....................... | E04H 12/04 248/219.2 |
| 7,113,144 B2 * | 9/2006 | Lin | .......................... | H01Q 3/08 343/880 |
| 8,573,545 B2 * | 11/2013 | Walquist | ................ | F24J 2/5233 248/122.1 |
| 8,578,666 B2 | 11/2013 | Yen et al. | | |
| 8,776,454 B2 * | 7/2014 | Zuritis | ................... | F24J 2/5207 126/621 |
| 8,939,143 B2 * | 1/2015 | Zuritis | ................... | F24J 2/5232 126/569 |
| 2012/0304556 A1 * | 12/2012 | Teller | ...................... | E04D 13/10 52/173.1 |
| 2013/0091786 A1 * | 4/2013 | DuPont | .................. | F24J 2/5249 52/173.3 |
| 2014/0102016 A1 * | 4/2014 | Hemingway | .......... | F24J 2/5256 52/173.3 |

FOREIGN PATENT DOCUMENTS

| | | |
|---|---|---|
| CN | 102386256 A | 3/2012 |
| CN | 102881747 A | 1/2013 |
| JP | 09177272 A | 7/1997 |
| TW | M443150 U | 12/2012 |

\* cited by examiner

*Primary Examiner* — Steven Marsh
(74) *Attorney, Agent, or Firm* — WPAT, P.C.; Justin King; Jonathan Chiang

(57) ABSTRACT

A supporting assembly for a solar cell lamination includes a frame member, a column member, and an adapter member. The frame member includes a first flange, a second flange, and a first wall. The second flange is substantially parallel with the first flange. The first flange, the second flange and the first wall cooperate to define a space for accommodating the solar cell lamination. The column member is used for supporting the frame member, in which the column member has an end surface facing the frame member. The end surface has a proximal half portion and a distal half portion respectively proximal and distal to a central axis of the frame member, and a location of a vertical projection of the first wall on the end surface falls on the distal half portion. The adapter member is used for connecting the column member and the frame member.

19 Claims, 10 Drawing Sheets

SUPPORTING ASSEMBLY

RELATED APPLICATIONS

This application claims priority to China Application Serial Number 201310074753.2, filed Mar. 8, 2013, which is herein incorporated by reference.

BACKGROUND

1. Field of Invention

The present invention generally relates to a supporting assembly. More particularly, the present invention relates to a supporting assembly for a solar cell lamination.

2. Description of Prior Art

In general, solar cell laminations are mostly erected outdoors by a supporting assembly to receive the solar light. Since the solar cell laminations and the supporting assemblies are systems placed outdoors for a long period of time, they must be able to withstand various harsh environmental conditions. For example, when the solar cell lamination and the supporting assembly are erected in a windy area, the solar cell lamination and the supporting assembly must have sufficient capacity to withstand the wind pressure. Also, if the solar cell lamination and the supporting assembly are erected in a snowy area, the solar cell lamination and the supporting assembly must have sufficient capacity to withstand the snow pressure.

However, as most of the existing supporting assemblies emphasize on the ability of rapid assembly, but not on the capacity to withstand pressure, when it has to withstand the wind pressure or snow pressure in the harsh environment conditions, it often has the risk of permanent deformation due to the lack of the supporting capacity. In serious occasions, the solar cell lamination will even fall apart.

SUMMARY

A technical aspect of the present invention is to provide a supporting assembly, in order to solve the problem mentioned in the description of prior art above.

According to an embodiment of the present invention, a supporting assembly for a solar cell lamination includes a frame member, a column member and an adapter member. The frame member includes a first flange, a second flange and a first wall. The second flange is substantially parallel with the first flange. The first wall connects the first flange and the second flange, such that the first flange, the second flange, and the first wall cooperate to define a space for accommodating the solar cell lamination. The column member is used for supporting the frame member, in which the column member has an end surface facing the frame member. The end surface has a proximal half portion and a distal half portion respectively proximal and distal to a central axis of the frame member. The location of the vertical projection of the first wall on the end surface falls on the distal half portion. The adapter member is used for connecting the column member and the frame member, in which the adapter member includes a supporting plate and at least one fixing plate. The frame member and the end surface of the column member respectively abut opposite surfaces of the supporting plate. The fixing plate connects to a bottom surface of the supporting plate in a substantially perpendicular way to fix the adapter member on the column member.

In one or more embodiments of the present invention, the adapter member further includes a first fastener and a second fastener. The first fastener is used for connecting and fixing the fixing plate and the column member. The second fastener is used for connecting and fixing the frame member and the supporting plate.

In one or more embodiments of the present invention, the supporting plate has at least one through hole therein. The frame member has at least one through hole therein, and the through hole of the frame member is a slot hole. The second fastener is used for passing through the through hole of the supporting plate and the through hole of the frame member for connecting and fixing the frame member and the supporting plate.

In one or more embodiments of the present invention, a surface of the frame member has an insulation layer coated thereon. The adapter member includes a screwing member. The screwing member is disposed on the frame member to connect with the second fastener to fix the frame member and the adapter member. The screwing member contacts with the frame member by breaking through the insulation layer.

In one or more embodiments of the present invention, the frame member further includes a third flange and a second wall. The third flange is substantially parallel with the second flange and is located below the second flange to abut against the supporting plate of the adapter member. The second wall is substantially parallel and is connected with the first wall for connecting the second flange and the third flange. The third flange has a first wing. The first wing and the second flange extend towards approximately the same direction along a direction approximately perpendicular to the second wall. The second fastener is used for connecting and fixing the first wing and the supporting plate.

In one or more embodiments of the present invention, the frame member further includes a third flange and a second wall. The third flange is substantially parallel with the second flange and is located below the second flange to abut against the supporting plate of the adapter member. The second wall is substantially parallel and connected with the first wall for connecting the second flange and the third flange. The third flange has a first wing and a second wing. The first wing and the second flange extend towards approximately the same direction along a direction approximately perpendicular to the second wall. The second wing extends in a direction opposite to that of the first wing along another direction approximately perpendicular to the second wall. The second fastener is used for connecting and fixing the second wing and the supporting plate.

In one or more embodiments of the present invention, the frame member further includes a fourth flange and a third wall. The fourth flange connects to the second wall, and is substantially parallel with the third flange and is located above the second wing of the third flange, in which the second fastener further connects to the fourth flange. The third wall connects to the fourth flange and the second wing of the third flange, such that at least a part of the second wall, the second wing of the third flange, the third wall and the fourth flange cooperate to form a hollow frame section.

In one or more embodiments of the present invention, the vertical height of the fourth flange to the second wing of the third flange is less than a vertical height of the second flange to the first wing of the third flange.

In one or more embodiments of the present invention, the vertical height of the fourth flange to the second wing of the third flange is approximately the same as a vertical height of the second flange to the first wing of the third flange.

According to another embodiment of the present invention, the supporting assembly for a solar cell lamination includes a frame member, a column member, and an adapter member. The frame member includes a first flange, a second flange and a first wall. The second flange is substantially parallel with the first flange. The first wall connects the first flange and the second flange, such that the first flange, the second flange, and the first wall cooperate to define a space, for accommodating the solar cell lamination. The column member is used for supporting the frame member and the column member has an end surface facing the frame member. The end surface has an inner edge and an outer edge opposite to each other. A central axis of the frame member is closer to the inner edge than the outer edge and a location of a vertical projection of the first wall on the end surface is closer to the outer edge than the inner edge. The adapter member is used for connecting the column member and the frame member.

In one or more embodiments of the present invention, the adapter member includes a supporting plate, at least one fixing plate, a first fastener and a second fastener. The frame member and the end surface of the column member respectively abut opposite surfaces of the supporting plate. The fixing plate connects to a bottom surface of the supporting plate in a substantially perpendicular way for fixing the adapter member on the column member. The first fastener is used for connecting and fixing the fixing plate and the column member. The second fastener is used for connecting and fixing the frame member and the supporting plate.

In one or more embodiments of the present invention, the supporting plate has at least one through hole therein. The frame member also has at least one through hole therein, and the through hole of the frame member is a slot hole. The second fastener is used for passing through the through hole of the supporting plate and the through hole of the frame member.

In one or more embodiments of the present invention, a surface of the frame member has an insulation layer coated thereon. The adapter member includes a screwing member. The screwing member is disposed on the frame member to connect with the second fastener to fix the frame member and the adapter member. The screwing member contacts with the frame member by breaking through the insulation layer.

In one or more embodiments of the present invention, the frame member further includes a third flange and a second wall. The third flange is substantially parallel with the second flange and is located below the second flange to abut against the supporting plate of the adapter member. The second wall is substantially parallel and connected with the first wall for connecting the second flange and the third flange. The third flange has a first wing. The first wing and the second flange extend towards approximately the same direction along a direction approximately perpendicular to the second wall. The second fastener connects and fixes the first wing and the supporting plate.

In one or more embodiments of the present invention, the frame member further includes a third flange and a second wall. The third flange is substantially parallel with the second flange and is located below the second flange to abut against the supporting plate of the adapter member. The second wall is substantially parallel and connected with the first wall for connecting the second flange and the third flange. The third flange has a first wing and a second wing. The first wing and the second flange extend towards approximately the same direction along a direction approximately perpendicular to the second wall. The second wing extends in a direction opposite to that of the first wing along another direction approximately perpendicular to the second wall. The second fastener connects and fixes the second wing and the supporting plate.

In one or more embodiments of the present invention, the frame member further includes a fourth flange and a third wall. The fourth flange connects to the second wall, and is substantially parallel with the third flange and is located above the second wing of the third flange, in which the second fastener further connects to the fourth flange. The third wall connects to the fourth flange and the second wing of the third flange, such that at least a part of the second wall, the second wing of the third flange, the third wall and the fourth flange cooperate to form a hollow frame section.

In one or more embodiments of the present invention, a vertical height of the fourth flange to the second wing of the third flange is less than a vertical height of the second flange to the first wing of the third flange.

In one or more embodiments of the present invention, a vertical height of the fourth flange to the second wing of the third flange is approximately the same as a vertical height of the second flange to the first wing of the third flange.

In one or more embodiments of the present invention, the adapter member includes a third fastener. The frame member has a through hole therein, and the column member has a fixing hole therein. The third fastener is used for passing through the through hole of the frame member and penetrating into the fixing hole of the column member for connecting and fixing the frame member and the column member.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
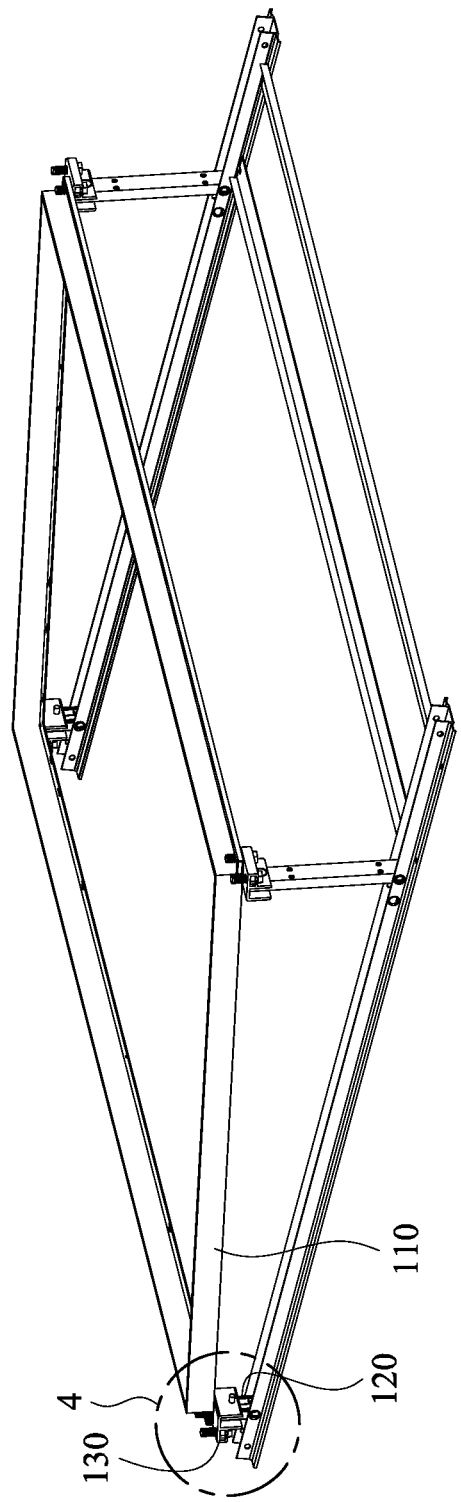
FIG. 1 is a 3-dimensional drawing of the supporting assembly according to the first embodiment of the present invention.

Reference will now be made in detail to the present embodiments of the invention, examples of which are illustrated in the accompanying drawings. Wherever possible, the same reference numbers are used in the drawings and the description to refer to the same or like parts.

Drawings will be used below to disclose a plurality of embodiments of the present invention. For the sake of clear illustration, many practical details will be explained together in the description below. However, it is appreciated that, the practical details should not be used to limit the present invention. That is, in some embodiments of the present invention, the practical details are not essential. Moreover, for the sake of drawing simplification, some customary structures and elements in the drawings will be schematically shown in a simplified way.

The words "about", "around" or "approximately" used in this article, generally refers to a value of tolerance or range within 20%, more preferably within 10%, and most preferably within 5%. If it is not stated expressly in the article, all the values mentioned are regarded as approximate values, having the tolerance or range as presented by "about", "around" or "approximately".

The First Embodiment

Figure 2:
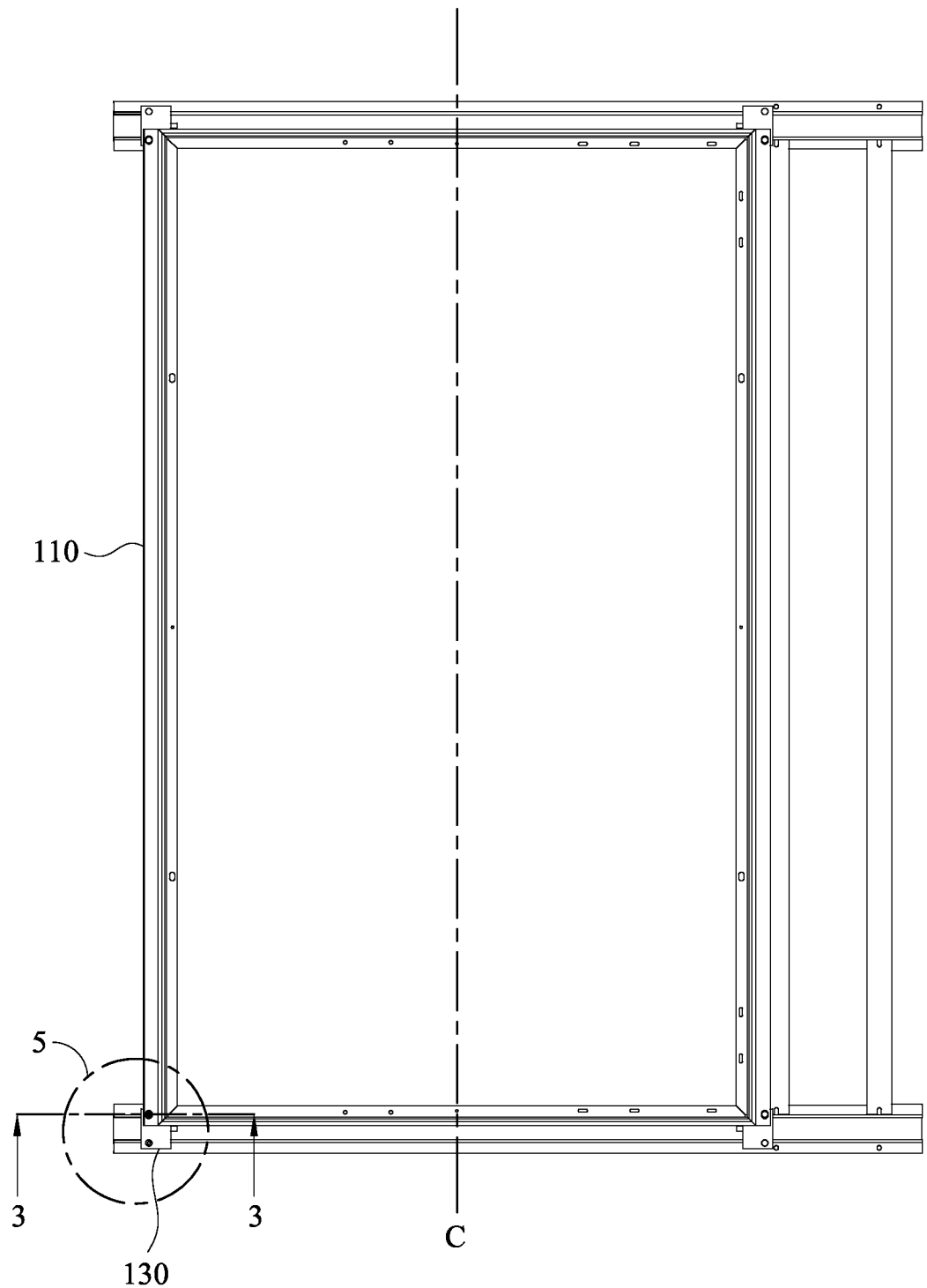
FIG. 2 is a plan view of the supporting assembly in FIG. 1.

FIG. 1 is a 3-dimensional drawing of the supporting assembly according to the first embodiment of the present invention. FIG. 2 is a plan view of the supporting assembly in FIG. 1. As shown in FIGS. 1 & 2, a supporting assembly for a solar cell lamination includes a frame member 110, a column member 120 and an adapter member 130. The frame member 110 is used for accommodating the solar cell lamination. The column member 120 stands on the floor. The adapter member 130 is used for connecting the column member 120 and the frame member 110.

In the present embodiment, the quantity for the column member 120 and the adapter member 130 both is 4, and the column member 120 and the adapter member 130 are respectively installed at the four corners of the frame member 110. Moreover, the column member 120 located at one side (for example the front side) of the frame member 110 is shorter than the column member 120 at the other side (for example the back side) of the frame member 110, leading to an inclination of the frame member 110 at a predetermined angle relative to the floor, such that the solar cell lamination installed thereon can receive the sun light. It is appreciated that, the quantity and the dimension relation of the column member 120 and the adapter member 130 as described above are illustrative only, and are not used for the limitation of the present invention. The person having ordinary skill in the art of the present invention should, based on the actual needs, flexibly choose the embodiment of the column member 120 and the adapter member 130.

Figure 3:
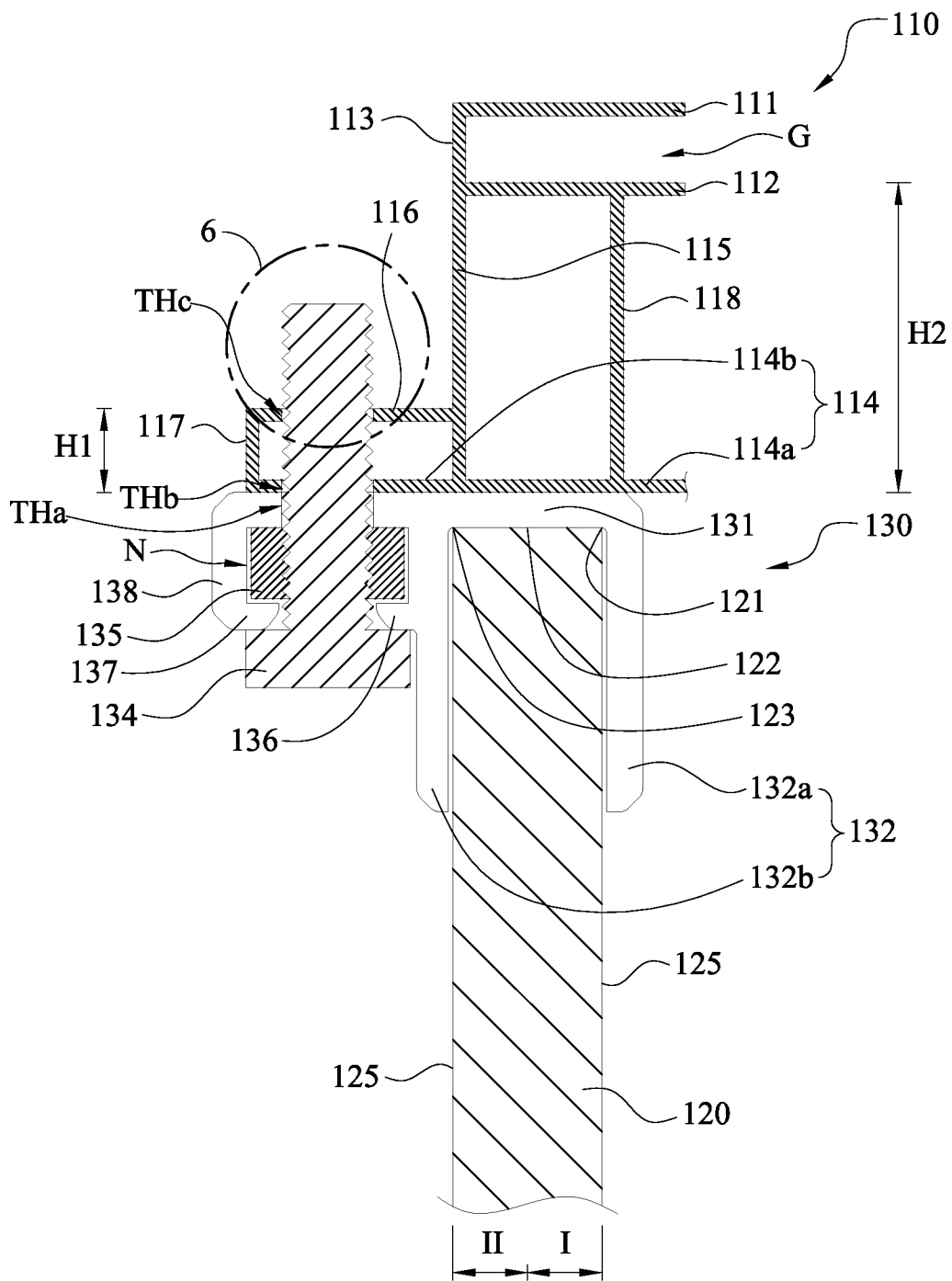
FIG. 3 is a cross-sectional view along a line section 3 of FIG. 2.
Figure 4:
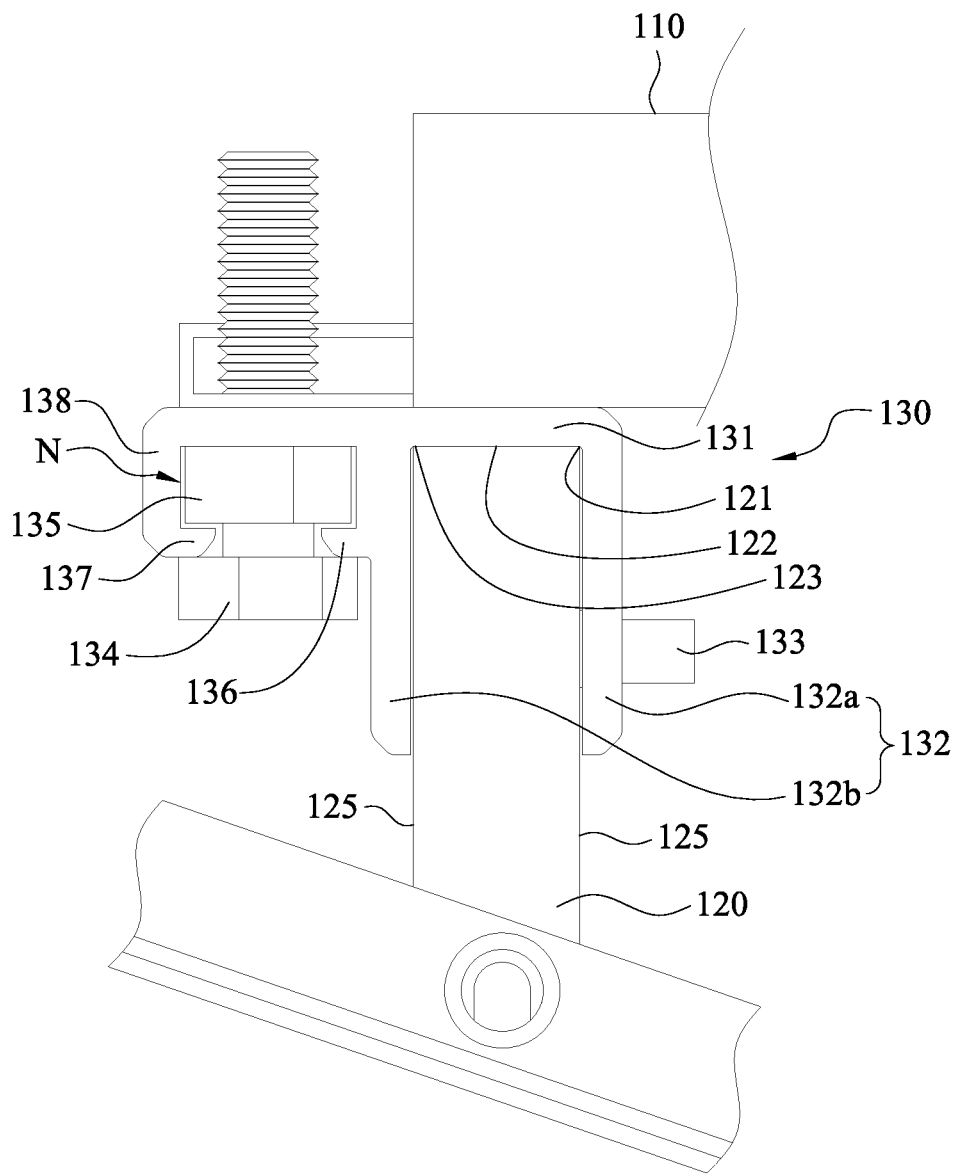
FIG. 4 is a side view of part 4 of FIG. 1.

FIG. 3 is a cross-sectional view along a line section 3 of FIG. 2. FIG. 4 is a side view of part 4 of FIG. 1. As shown in the figures, the frame member 110 includes a first flange 111, a second flange 112 and a first wall 113. The second flange 112 is substantially parallel with the first flange 111 and the second flange 112 is located below the first flange 111. The first wall 113 connects the first flange 111 and the second flange 112, such that the first flange 111, the second flange 112, and the first wall 113 cooperate to define a space G for accommodating the solar cell lamination. The column member 120 is used for supporting the frame member 110, in which the column member 120 has an end surface 122 facing the frame member 110. The end surface 122 has a proximal half portion I and a distal half portion II respectively proximal and distal to a central axis C of the frame member 110 (shown in FIG. 2). A location of a vertical projection of the first wall 113 on the end surface 122 falls on the distal half portion II. In other words, the end surface 122 above-mentioned has an inner edge 121 and an outer edge 123 opposite to each other. Compared to the outer edge 123, the inner edge 121 is closer to the central axis C of the frame member 110. The location of the vertical projection of the first wall 113 on the surface where the end surface 122 is located is relatively far from the inner edge 121, but relatively close to the outer edge 123. That is, compared to the inner edge 121, the outer edge 123 is closer to the location of the vertical projection of the first wall 113 on the surface where the end surface 122 is located.

In the present design, when the frame member 110 has accommodated the solar cell lamination, an axial force of the column member 120 can fully support the frame member 110 and the solar cell lamination, so as to reduce the risk of permanent deformation of the column member 120 or the adapter member 130. Moreover, as the axial force of the column member 120 can fully support the frame member 110 and the solar cell lamination, the capacity of the whole system to withstand wind pressure or snow pressure is also increased.

In the present embodiment, the location of the vertical projection of the first wall 113 on the surface where the end surface 122 is located can overlap with the outer edge 123. However, this does not limit the present invention. The person having ordinary skill in the art of the present invention should, based on the actual needs flexibly choose the position of the first wall 113.

Please keep referring to FIGS. 3 & 4. The adapter member 130 above-mentioned includes a supporting plate 131, at least one fixing plate 132, a first fastener 133 and a second fastener 134. The frame member 110 and the end surface 122 of the column member 120 abut respectively the two opposite sides of the supporting plate 131. The fixing plate 132 connects to a bottom surface of the supporting plate 131 in a substantially perpendicular way to fix the adapter member 130 on the column member 120. The column member 120 has a side surface 125, and the side surface 125 connects to the end surface 122. The fixing plate 132 abuts to the side surface 125 of the column member 120. The first fastener 133 is used for connecting and fixing the fixing plate 132 and the column member 120. The second fastener 134 is used for connecting and fixing the frame member 110 and the supporting plate 131.

Specifically, the quantity of the fixing plate 132 above-mentioned is 2, for example, a fixing plate 132a and a fixing plate 132b. The fixing plate 132a, the fixing plate 132b and the part of the supporting plate 131 therebetween cooperate to define a cross section in a substantially reverse "U" shape (or, n shape), to restrain the column member 120 between the fixing plate 132a and the fixing plate 132b. The first fastener 133 is used for connecting and fixing the fixing plate 132a, the column member 120 and the fixing plate 132b, to securely fix the relative position of the column member 120 and the adapter member 130. In the present embodiment, the fastener 133 can be a bolt, a pin, a screw, or other suitable fasteners.

In the present embodiment, the frame member 110 further includes a third flange 114 and a second wall 115. The third flange 114 is substantially parallel with the second flange 112 and is located below the second flange 112 for abutting against the supporting plate 131 of the adapter member 130. The second wall 115 and the first wall 113 are parallel and connected at the junction with the second flange 112, and the second wall 115 connects to the second flange 112 and the third flange 114. The third flange 114 has a first wing 114a and a second wing 114b. The first wing 114a and the second flange 112 extend towards approximately the same direction along the direction approximately perpendicular to the second wall 115, i.e., extend towards the inside of the frame member 110. The second wing 114b extends in a direction opposite to that of the second flange 112 along the direction approximately perpendicular to the second wall 115, i.e., extend towards the outside of the frame member 110. The junction of the third flange 114 and the second wall 115 is the junction of the first wing 114a and the second wing 114b, and the first wing 114a and the second wing 114b extend in the opposite directions with regard to the junction of the second wall 115.

Moreover, the frame member 110 of the present embodiment further includes a fourth flange 116 and a third wall 117. The fourth flange 116 connects to the second wall 115. The fourth flange 116 is substantially parallel with the third flange 114 and is located above the second wing 114b of the third flange 114. The third wall 117 connects to the fourth flange 116 and the second wing 114b of the third flange 114, such that at least a part of the second wall 115, the second wing 114b of the third flange 114, the third wall 117 and the fourth flange 116 cooperate to form a hollow frame section. The first flange 111, the second flange 112, the third flange 114 and the fourth flange 116 of the frame member 110 above-mentioned are substantially horizontal members, and the first wall 113, the second wall 115 and the third wall 117 are substantially vertical members.

In the present embodiment, a vertical height H1 of the fourth flange 116 to the second wing 114b of the third flange 114 is less than a vertical height H2 of the second flange 112 to the first wing 114a of the third flange 114. However, this does not limit the present invention. The person having ordinary skill in the art of the present invention should, based on the actual needs, flexibly choose the relative position of the fourth flange 116 and the second flange 112.

Moreover, in the present embodiment, in order to strengthen the bending resistance of the frame member 110, the manufacturer can choose to install a stiffener 118 between the second flange 112 and the first wing 114a of the third flange 114. It is appreciated that, the stiffener 118 is not an essential element, if the strength of the frame member 110 is enough, the stiffener 118 can be optionally omitted and not installed.

In the present embodiment, in order to securely make use of the axial force of the column member 120 to support the frame member 110 and the solar cell lamination, the locations of the vertical projection of both the second wall 115 and the stiffener 118 on the surface where the end surface 122 is located fall on the end surface 122. More specifically, the location of the vertical projection of the second wall 115 above-mentioned on the end surface 122 falls on the distal half portion II. That is, compared to the inner edge 121, the outer edge 123 is closer to the position of the vertical projection of the second wall 115 on the end surface 122. The location of the vertical projection of the stiffener 118 above-mentioned on the end surface 122 falls on the proximal half portion I. That is, compared to the outer edge 123, the inner edge 121 is closer to the position of the vertical projection of the stiffener 118 on the end surface 122.

In the present embodiment, the supporting plate 131, the second wing 114b of the third flange 114 and the fourth flange 116 have respectively a through hole THa, a through hole THb and a through hole THc therein. The second fastener 134 is used for passing through together the through hole THa, the through hole THb and the through hole THc, for connecting and fixing the supporting plate 131, the second wing 114b of the third flange 114 and the fourth flange 116, to fix the relative position of the frame member 110 and the adapter member 130. The second fastener 134 above-mentioned can be a bolt, a pin a screw, or other suitable fasteners.

Figure 5:
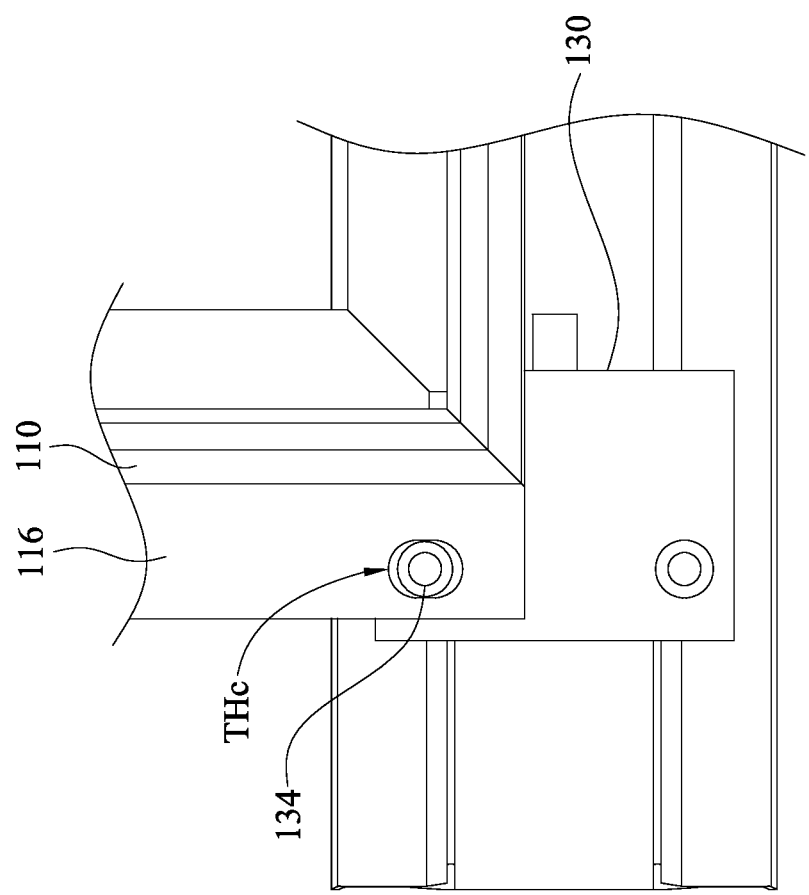
FIG. 5 is an enlarged view of part 5 of FIG. 2.

FIG. 5 is an enlarged view of part 5 of FIG. 2. As shown in the figure, in the present embodiment, the through hole (for example: through hole THc) of the frame member 110 can be a slot hole. During assembly, the frame member 110 mounted with the solar cell lamination and the adapter member 130 may not be able to match up due to an uneven ground. In this point, if the through hole (for example, through hole THc) of the frame member 110 is a slot hole, it can generate a part of allowable range for the tolerance, facilitating the accomplishment of the assembly.

Please refer back to FIGS. 3 & 4. In the embodiment with the second fastener 134 as a bolt, if the thickness of the supporting plate 131, the second wing 114b of the third flange 114 and the fourth flange 116 are respectively too thin for threading, the assembler can choose to use a nut 135 to fix the bolt (i.e., the second fastener 134). More specifically, the adapter member 130 of the present embodiment further includes a first fixing wing 136, a second fixing wing 137 and a fixing wall 138. The first fixing wing 136 connects to the fixing plate 132b. The second fixing wing 137 and the first fixing wing 136 are separated to allow the bolt (i.e., the second fastener 134) to pass through therebetween. The fixing wall 138 connects to the supporting plate 131 and the second fixing wing 137, such that the first fixing wing 136, the second fixing wing 137, the fixing wall 138, a part of the supporting plate 131 and a part of the fixing plate 132b cooperate to define a nut accommodation space N. The nut 135 locates in the bolt accommodation space N. The bolt (i.e., the second fastener 134) passes through the space between the first fixing wing 136 and the second fixing wing 137 and is locked in the nut 135.

In the present embodiment, since the nut 135 cannot move in the vertical direction due to the restraints of the first fixing wing 136 and the second fixing wing 137, such that the bolt (i.e., the second fastener 134) as locked in the nut 135 cannot move in the vertical direction neither. Thus, a nut is not necessary on the fourth flange 116, saving the assembly process. Moreover, since the weight of the solar cell lamination and the frame member 110 is heavy so much, thus, even if no bolt is fixed on the fourth flange 116, the frame member 110 is uneasy to detach from the bolt (i.e., the second fastener 134).

Certainly, the assembler can choose to refit the nut 135 on the fourth flange 116, or to install the nut 135 below the supporting plate 131 and on the fourth flange 116 as well. Moreover, in the embodiment which the nut 135 is refitted on the fourth flange 116 (i.e., the nut 135 is installed only on the fourth flange 116, but not below the supporting plate 131), or the second fastener 134 as a pin, the adapter member 130 does not need to have the first fixing wing 136, the second fixing wing 137 and the fixing wall 138. Moreover, if the thickness of either the frame member 110 or the adapter member 130 is thick enough for threading, the assembler can choose to thread on the frame member 110 and/or the adapter member 130 to directly lock the bolt (i.e., the second fastener 134) on the thread, while it is unnecessary to install the nut 135. The person having ordinary skill in the art of the present invention should, based on the actual needs, flexibly choose the embodiment of the adapter member 130.

Figure 6:
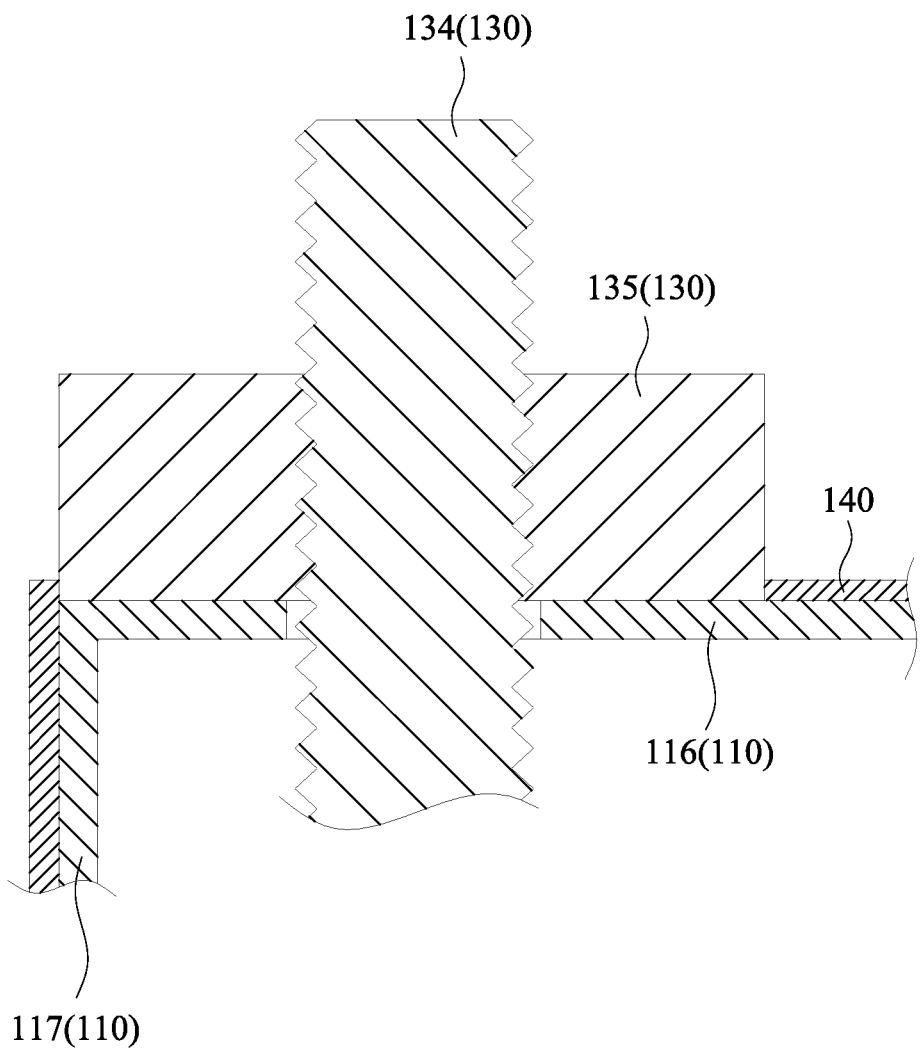
FIG. 6 is a partial sectional view of the supporting assembly according to another embodiment of the present invention, with the sectional area as indicated by part 6 of FIG. 3.

FIG. 6 is a partial sectional view of the supporting assembly according to another embodiment of the present invention, with the sectional area as indicated by part 6 of FIG. 3. In the present embodiment, the supporting assembly further includes an insulation layer 140 and the insulation layer 140 is coated on the surface of the frame member 110 (for example the surface of the fourth flange 116 and the third wall 117). Since the solar cell lamination generates electricity when exposed to light, the existence of the insulation layer 140 can avoid the electricity generated by the solar cell lamination from electrically shocking the assembler through the frame member 110. The insulation layer 140 above-mentioned can be, for example, an anodic film.

In the present embodiment, the adapter member 130 can include a screwing member. The screwing member is disposed on the frame member 110 for connecting with the second fastener 134 to fix the frame member 110 and the adapter member 130. The screwing member contacts with the frame member 110 by breaking through the insulation layer 140. For example, in FIG. 6, the nut 135 can be screwed with the second fastener 134 on the fourth flange 116. The nut 135 breaks through the insulation layer 140 and is in direct contact with the fourth flange 116. In this way, a conductive channel is produced between the adapter member 130 and the frame member 110, allowing the grounding of the solar cell lamination through the frame member 110, the adapter member 130 and the column member 120.

It is appreciated that, although FIG. 6 is the use of the nut 135 to break through the insulation layer 140, this does not limit the present invention. In one or more embodiments, it can also choose to break through the insulation layer 140 using a bolt head or a washer. The person having ordinary skill in the art of the present invention should, based on the actual needs, flexibly choose the embodiment.

In the embodiment above, the material of the frame member can be metal, such as aluminum alloy, steel, stainless steel and combinations thereof. The manufacturing method of the frame member 110 can be forging, casting and combinations thereof. Certainly, if there is no concern about the material and the shape of the frame, the frame member 110 can also choose to firstly produce as strips by the method of aluminum extrusion, and then using these strips to form the frame member 110. From the structural point of view, the first flange 111, the second flange 112, the first wall 113, the third flange 114, the second wall 115, the fourth flange 116, the third wall 117 and the stiffener 118 above-mentioned, are an integrated element.

Moreover, the material of the adapter member 130 above-mentioned can be metal, such as aluminum alloy, steel, stainless steel and combinations thereof. The manufacturing method of the adapter member 130 can be forging, casting and combinations thereof. From the structural point of view, the supporting plate 131, the fixing plates 132, the first fixing wing 136, the second fixing wing 137 and the fixing wall 138 above-mentioned, are an integrated element, while the first fastener 133, the second fastener 134 and the nut 135 (if any) are independent elements.

Furthermore, the material of the column member 120 above-mentioned can be metal, such as aluminum alloy, steel, stainless steel and combinations thereof. The manufacturing method of the column member 120 can be forging, casting and combinations thereof.

The Second Embodiment

Figure 7:
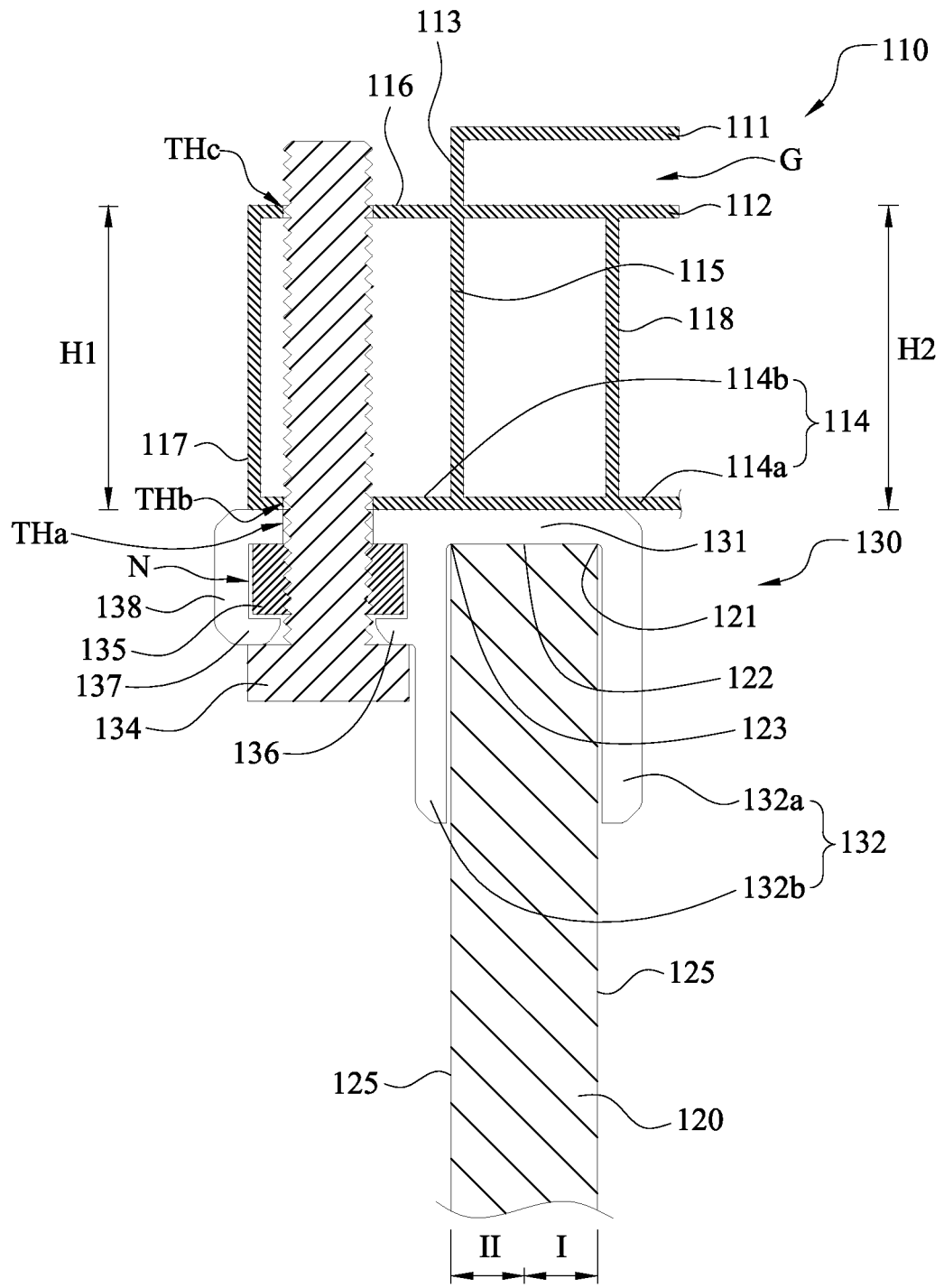
FIG. 7 is a cross-sectional view of the supporting assembly according to the second embodiment of the present invention, with the position of the section same as FIG. 3.

FIG. 7 is a cross-sectional view of the supporting assembly according to the second embodiment of the present invention, with the position of the section same as FIG. 3. The difference between the present embodiment and the first embodiment is: in the present embodiment, the vertical height H1 of the fourth flange 116 to the second wing 114b of the third flange 114 is approximately equal to the vertical height H2 of the second flange 112 to the first wing 114a of the third flange 114. Since other related details of structure and material are the same as the first embodiment, it is not repeatedly described.

The Third Embodiment

Figure 8:
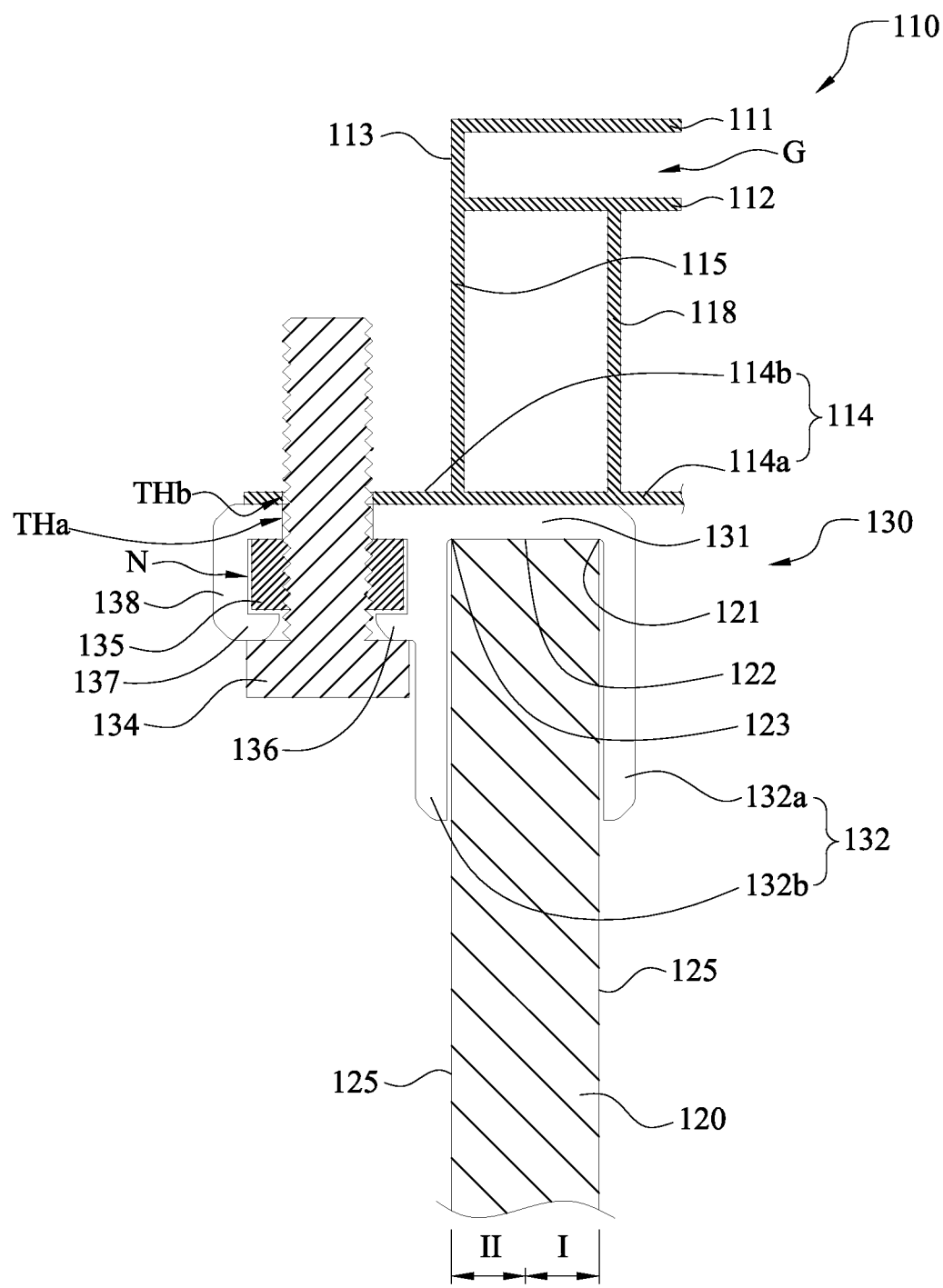
FIG. 8 shows schematically a cross-sectional view of the supporting assembly according to the third embodiment of the present invention, with the position of the section same as FIG. 3.

FIG. 8 is a cross-sectional view of the supporting assembly according to the third embodiment of the present invention, with the position of the section same as FIG. 3. The difference between the present embodiment and the first embodiment is: the frame member 110 in the present embodiment omits the fourth flange 116 and the third wall 117, thus the second fastener 134 is used for passing through together only the through hole THa and the through hole THb for connecting and fixing the supporting plate 131 and the second flange 114b of the third flange 114, to fix the relative position of the frame member 110 and the adapter member 130. Since other related details of structure and material are the same as the first embodiment, it is not repeatedly described.

The Fourth Embodiment

Figure 9:
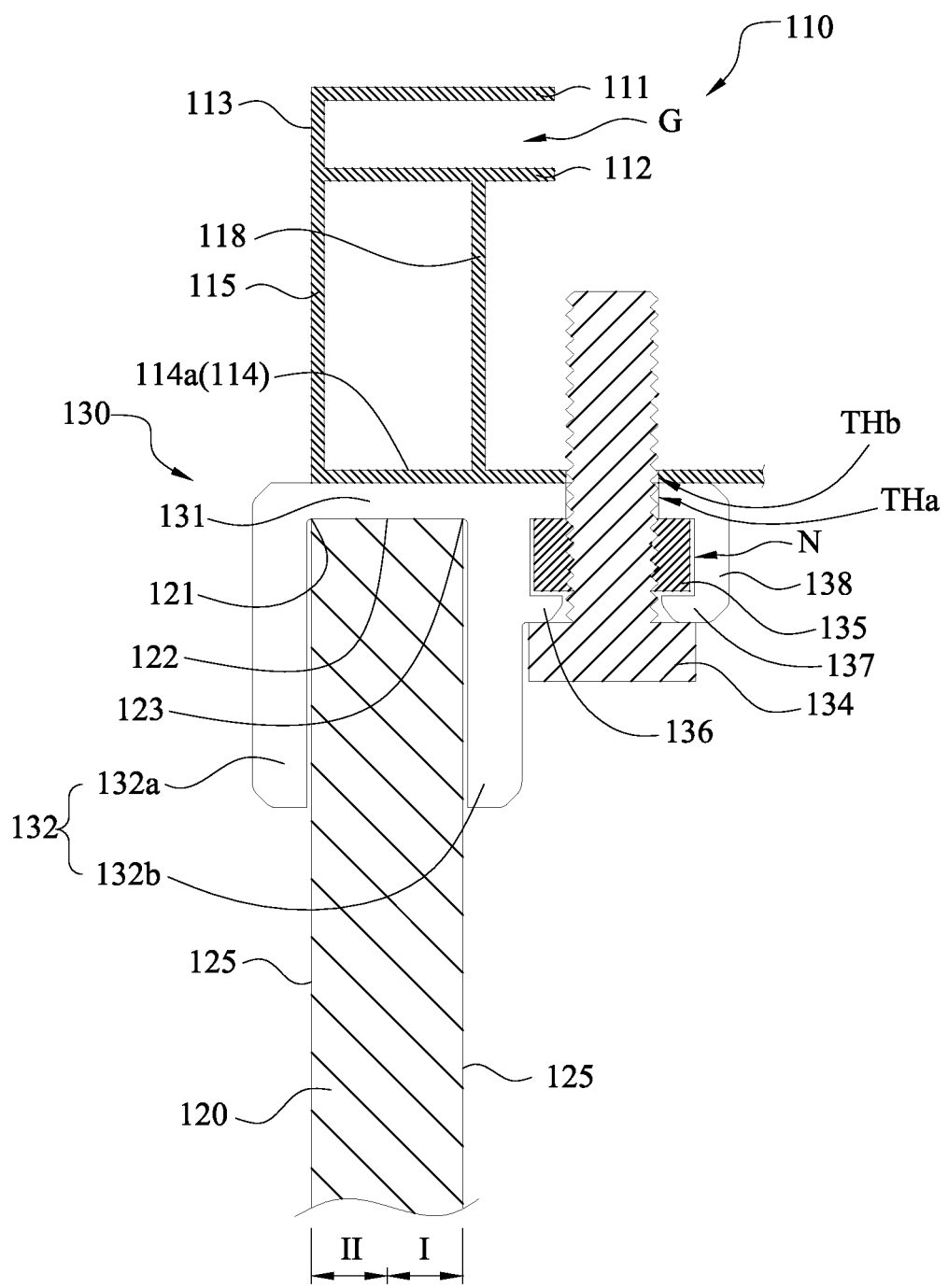
FIG. 9 shows schematically a cross-sectional view of the supporting assembly according to the fourth embodiment of the present invention, with the position of the section same as FIG. 3.

FIG. 9 is a cross-sectional view of the supporting assembly according to the fourth embodiment of the present invention, with the position of the section same as FIG. 3. The difference between the present embodiment and the first embodiment is: the frame member 110 in the present embodiment omits the fourth flange 116, the third wall 117 and the second wing 114b of the third flange 114. Moreover, the present embodiment changes the through hole THa to the first wing 114a of the third flange 114, and changes the through hole THb, the second fastener 134, the nut 135, the first fixing wing 136, the second fixing wing 137 and the fixing wall 138 to the other side of the adapter member 130, such that the through hole THb and the through hole THa are relatively aligned. In the present embodiment, the second fastener 134 is used for passing through together the through hole THa and the through hole THb for connecting and fixing the supporting plate 131 and the first wing 114a of the third flange 114, to fix the relative position of the frame member 110 and the adapter member 130. Since other related details of structure and material are the same as the first embodiment, it is not repeatedly described.

The Fifth Embodiment

Figure 10:
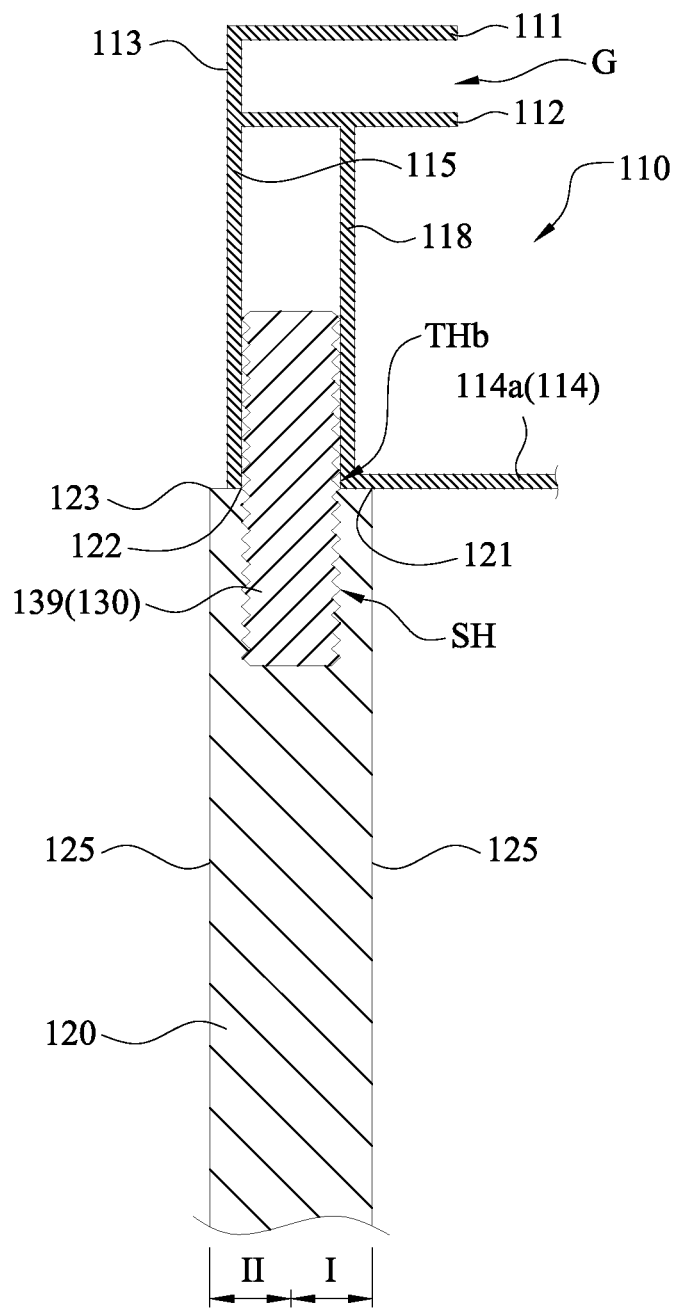
FIG. 10 shows schematically a cross-sectional view of the supporting assembly according to the fifth embodiment of the present invention, with the position of the section same as FIG. 3.

FIG. 10 is a cross-sectional view of the supporting assembly according to the fifth embodiment of the present invention, with the position of the section same as FIG. 3. The difference between the present embodiment and the first embodiment is: the adapter member 130 in the present embodiment only includes the third fastener 139, the through hole THb changes to the first wing 114a of the third flange 114, and is located between the second wall 115 and the stiffener 118. The column member 120 has a fixing hole SH on it. In the present embodiment, the third fastener 139 is used for passing through the through hole THb and penetrating into the fixing hole SH, for connecting and fixing the frame member 110 and the column member 120. Thus, the third flange 114 of the frame member 110 directly abuts against the end surface 122 of the column member 120, and the second wall 115 (which is the vertical projection of the first wall 113) extends to abut against the distal half portion II of the end surface 122. The third fastener 139 above-mentioned can be a stud, a pin and combinations thereof. Since other related details of structure and material are the same as the first embodiment, it is not repeatedly described.

The examples of the present invention are disclosed below, so as to illustrate that the supporting assembly of the embodiment above-mentioned can surely provide the performance required. It is appreciated that, in the description below, the parameters already mentioned in the embodiments above are not repeatedly described, and supplement are added only when further definition is required, as stated in advance.

In the example below, the supporting assembly in the first embodiment is mainly adopted. Only in the present example, a nut is installed below the supporting plate 131 and also on the fourth flange 116. The material of the frame member 110 is aluminum alloy (AL5052H32 or AL6063T5), the supporting plate 131, the fixing plate 132, the first fixing wing 136, the second fixing wing 137 and the fixing wall 138 is an integrated aluminum alloy (AL5052H32 or AL6063T5). The materials of the first fastener 133, the second fastener 134 and the nut 135 are all stainless steel (SUS304). The elastic modulus, the yield strength and the fracture strength are shown in Table 1 below.

TABLE 1

Elastic modulus, yield strength and fracture strength of each material

|  | Elastic Modulus (MPa) | Yield Strength (MPa) | Fracture Strength (MPa) |
| --- | --- | --- | --- |
| AL5052H32 | 70300 | 193 | 228 |
| AL6063T5 | 70300 | 145 | 186 |
| SUS304 | 200000 | 215 | 505 |

Under the conditions above, the front side of the simulated solar cell lamination withstands a uniform pressure of 5400 Pa. The result shows that each element of the supporting assembly does not have the risk of fracture, surely being able to withstand a uniform pressure of 5400 Pa.

Although the present invention has been described in considerable detail with reference to certain embodiments thereof, other embodiments are possible. Therefore, their spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention covers the modifications and variations of this invention provided they fall within the scope of the following claims.

What is claimed is:

1. A supporting assembly for a solar cell lamination, the supporting assembly comprising:
    a frame member comprising:
        a first flange;
        a second flange substantially parallel with the first flange; and
        a first wall connecting the first flange and the second flange, such that the first flange, the second flange and the first wall cooperate to define a space for accommodating the solar cell lamination;
    a column member for supporting the frame member, wherein the column member has an end surface facing the frame member, the end surface has a proximal half portion and a distal half portion respectively proximal and distal to a central axis of the frame member, and an imaginary vertical projection of the first wall on the end surface falls on the distal half portion; and
    an adapter member for connecting the column member and the frame member, wherein the adapter member comprises:
        a supporting plate, wherein the frame member and the end surface of the column member respectively abut opposite surfaces of the supporting plate; and
        at least one fixing plate connected to a bottom surface of the supporting plate in a substantially perpendicular way to fix the adapter member on the column member.

2. The supporting assembly of claim 1, wherein the adapter member further comprises:
    a first fastener for connecting and fixing the fixing plate and the column member; and
    a second fastener for connecting and fixing the frame member and the supporting plate.

3. The supporting assembly of claim 2, wherein the supporting plate has at least one through hole therein, the frame member has at least one through hole therein, the through hole of the frame member is a slot hole, and the second fastener is used for passing through the through hole of the supporting plate and the through hole of the frame member for connecting and fixing the frame member and the supporting plate.

4. The supporting assembly of claim 3, wherein a surface of the frame member has an insulation layer coated thereon, the adapter member comprises a screwing member, the screwing member is disposed on the frame member to connect with the second fastener to fix the frame member and the adapter member, and the screwing member contacts with the frame member by breaking through the insulation layer.

5. The supporting assembly of claim 1, wherein the frame member further comprises:
    a third flange substantially parallel with the second flange and located below the second flange to abut against the supporting plate of the adapter member; and
    a second wall substantially parallel and connected with the first wall for connecting the second flange and the third flange,
    wherein the third flange has a first wing, the first wing and the second flange extend towards approximately the same direction along a direction approximately perpendicular to the second wall, and the second fastener connects and fixes the first wing and the supporting plate.

6. The supporting assembly of claim 1, wherein the frame member further comprises:
    a third flange substantially parallel with the second flange and located below the second flange to abut against the supporting plate of the adapter member; and
    a second wall substantially parallel and connected with the first wall for connecting the second flange and the third flange,
    wherein the third flange has a first wing and a second wing, the first wing and the second flange extend towards approximately the same direction along a direction approximately perpendicular to the second wall, the second wing extends in a direction opposite to that of the first wing along another direction approximately perpendicular to the second wall, and the second fastener connects and fixes the second wing and the supporting plate.

7. The supporting assembly of claim 6, wherein the frame member further comprises:
    a fourth flange connected to the second wall, substantially parallel with the third flange and located above the second wing of the third flange, wherein the second fastener further connects to the fourth flange; and
    a third wall connected to the fourth flange and the second wing of the third flange, such that at least a part of the second wall, the second wing of the third flange, the third wall, and the fourth flange cooperate to form a hollow frame section.

8. The supporting assembly of claim 7, wherein a vertical height of the fourth flange to the second wing of the third flange is less than a vertical height of the second flange to the first wing of the third flange.

9. The supporting assembly of claim 7, wherein a vertical height of the fourth flange to the second wing of the third flange is approximately the same as a vertical height of the second flange to the first wing of the third flange.

10. A supporting assembly for a solar cell lamination, the supporting assembly comprising:
   a frame member comprising:
      a first flange;
      a second flange substantially parallel with the first flange; and
      a first wall connecting the first flange and the second flange, such that the first flange, the second flange, and the first wall cooperate to define a space for accommodating the solar cell lamination;
   a column member for supporting the frame member, the column member has an end surface facing the frame member, the end surface has an inner edge and an outer edge opposite to each other, a central axis of the frame member is closer to the inner edge than the outer edge, and an imaginary vertical projection of the first wall on the end surface is closer to the outer edge than the inner edge; and
   an adapter member for connecting the column member and the frame member.

11. The supporting assembly of claim 10, wherein the adapter member comprises:
   a supporting plate, wherein the frame member and the end surface of the column member respectively abut opposite surfaces of the supporting plate;
   at least one fixing plate connected to a bottom surface of the supporting plate in a substantially perpendicular way for fixing the adapter member on the column member;
   a first fastener for connecting and fixing the fixing plate and the column member, and
   a second fastener for connecting and fixing the frame member and the supporting plate.

12. The supporting assembly of claim 11, wherein the supporting plate has at least one through hole therein, the frame member also has at least one through hole therein, the through hole of the frame member is a slot hole, and the second fastener is used for passing through the through hole of the supporting plate and the through hole of the frame member.

13. The supporting assembly of claim 12, wherein a surface of the frame member has an insulation layer coated thereon, the adapter member comprises a screwing member, the screwing member is disposed on the frame member to connect with the second fastener to fix the frame member and the adapter member, and the screwing member contacts with the frame member by breaking through the insulation layer.

14. The supporting assembly of claim 11, wherein the frame member further comprises:
   a third flange substantially parallel with the second flange and located below the second flange to abut against the supporting plate of the adapter member; and
   a second wall substantially parallel and connected with the first wall for connecting the second flange and the third flange,
   wherein the third flange has a first wing, the first wing and the second flange extend towards approximately the same direction along a direction approximately perpendicular to the second wall, and the second fastener connects and fixes the first wing and the supporting plate.

15. The supporting assembly of claim 11, wherein the frame member further comprises:
   a third flange substantially parallel with the second flange and located below the second flange to abut against the supporting plate of the adapter member; and
   a second wall substantially parallel and connected with the first wall for connecting the second flange and the third flange,
   wherein the third flange has a first wing and a second wing, the first wing and the second flange extend towards approximately the same direction along a direction approximately perpendicular to the second wall, the second wing extends in a direction opposite to that of the first wing along another direction approximately perpendicular to the second wall, and the second fastener connects and fixes the second wing and the supporting plate.

16. The supporting assembly of claim 15, wherein the frame member further comprises:
   a fourth flange connected to the second wall, substantially parallel with the third flange, and located above the second wing of the third flange, wherein the second fastener further connects to the fourth flange; and
   a third wall connected to the fourth flange and the second wing of the third flange, such that at least a part of the second wall, the second wing of the third flange, the third wall, and the fourth flange cooperate to form a hollow frame section.

17. The supporting assembly of claim 16, wherein a vertical height of the fourth flange to the second wing of the third flange is less than a vertical height of the second flange to the first wing of the third flange.

18. The supporting assembly of claim 16, wherein a vertical height of the fourth flange to the second wing of the third flange, is approximately the same as a vertical height of the second flange to the first wing of the third flange.

19. The supporting assembly of claim 10, wherein the adapter member comprises a third fastener, the frame member has a through hole therein, the column member has a fixing hole therein, the third fastener is used for passing through the through hole of the frame member and penetrating into the fixing hole of the column member for connecting and fixing the frame member and the column member.

* * * * *